United States Patent
Sadahiro et al.

(10) Patent No.: US 10,386,974 B2
(45) Date of Patent: Aug. 20, 2019

(54) DETECTING INPUT BASED ON A SENSED CAPACITIVE INPUT PROFILE

(71) Applicant: Microsoft Technology Licensing, LLC, Redmond, WA (US)

(72) Inventors: Ken M. Sadahiro, Redmond, WA (US); Ron Mondri, Bellevue, WA (US); Christian Klein, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 41 days.

(21) Appl. No.: 15/426,108

(22) Filed: Feb. 7, 2017

(65) Prior Publication Data

US 2018/0224958 A1   Aug. 9, 2018

(51) Int. Cl.
*G06F 3/044* (2006.01)
*G06F 3/0354* (2013.01)
*G06F 3/041* (2006.01)

(52) U.S. Cl.
CPC ......... *G06F 3/044* (2013.01); *G06F 3/03545* (2013.01); *G06F 3/0416* (2013.01); *G06F 2203/04101* (2013.01); *G06F 2203/04104* (2013.01); *G06F 2203/04106* (2013.01)

(58) Field of Classification Search
CPC ........ G06F 3/041; G06F 3/0412; G06F 3/044; G06F 3/03545; G06F 3/04847; G06F 2203/04101; G06F 2203/04106
USPC ........................................................ 345/173
See application file for complete search history.

(56) References Cited

U.S. PATENT DOCUMENTS

| | | | |
|---|---|---|---|
| 6,903,662 B2 * | 6/2005 | Rix | G06F 3/0202 340/10.6 |
| 8,098,240 B2 | 1/2012 | Zielinski et al. | |
| 8,803,814 B2 | 8/2014 | Andolina | |
| 2006/0256090 A1 | 11/2006 | Huppi | |

(Continued)

FOREIGN PATENT DOCUMENTS

WO    2016124584 A2    8/2016

OTHER PUBLICATIONS

Jun Rekimoto. "SmartSkin: An Infrastructure for Freehand Manipulation on Interactive Surfaces." Apr. 2002 (Year: 2002).*

(Continued)

*Primary Examiner* — Jason M Mandeville
(74) *Attorney, Agent, or Firm* — International IP Law Group, PLLC

(57) ABSTRACT

In one example, a method for detecting input can include detecting a capacitive input pattern of an object in proximity of the system and comparing the capacitive input pattern to a sensed capacitive input profile of a known object, the sensed capacitive input profile comprising information about a plurality of characteristics of the known object. The method can also include determining a confidence that the object in proximity of the system corresponds to the known object based on the capacitive input pattern and at least one of the plurality of characteristics of the known object. Furthermore, the method can include assigning a functionality associated with the sensed capacitive input profile to the object in proximity of the system if the confidence exceeds a threshold and processing input received from the object in proximity of the system according to the functionality.

20 Claims, 7 Drawing Sheets

(56) References Cited

U.S. PATENT DOCUMENTS

| | | | |
|---|---|---|---|
| 2007/0062852 A1* | 3/2007 | Zachut | A63F 3/00643 209/683 |
| 2009/0114457 A1 | 5/2009 | Lii | |
| 2011/0057670 A1* | 3/2011 | Jordan | G06F 3/0416 324/679 |
| 2012/0062490 A1 | 3/2012 | Heatherly et al. | |
| 2012/0182225 A1 | 7/2012 | Brosnan | |
| 2012/0194457 A1* | 8/2012 | Cannon | G06F 3/011 345/173 |
| 2012/0212422 A1 | 8/2012 | Fang | |
| 2012/0249430 A1 | 10/2012 | Oster et al. | |
| 2013/0002574 A1* | 1/2013 | Kim | G06F 3/041 345/173 |
| 2013/0012313 A1 | 1/2013 | Chen | |
| 2013/0044078 A1 | 2/2013 | Hallenberg et al. | |
| 2013/0106766 A1 | 5/2013 | Yilmaz et al. | |
| 2013/0194192 A1 | 8/2013 | Andolina | |
| 2013/0302777 A1 | 11/2013 | Tomkins et al. | |
| 2013/0314375 A1 | 11/2013 | Rickstrom et al. | |
| 2014/0101576 A1 | 4/2014 | Kwak et al. | |
| 2014/0327628 A1 | 11/2014 | Tijssen et al. | |
| 2014/0354565 A1 | 12/2014 | Yoon | |
| 2015/0094621 A1 | 4/2015 | Alberts et al. | |
| 2015/0199941 A1* | 7/2015 | Reunamaki | G06F 3/0416 345/174 |
| 2015/0220169 A1 | 8/2015 | Keating et al. | |
| 2015/0242018 A1 | 8/2015 | Shi | |
| 2015/0261378 A1* | 9/2015 | Lee | G06F 3/0416 715/765 |
| 2016/0040974 A1 | 2/2016 | Zachut et al. | |
| 2016/0151714 A1 | 6/2016 | Shi | |
| 2016/0209957 A1 | 7/2016 | Junk et al. | |
| 2016/0283035 A1 | 9/2016 | Sandblad et al. | |

OTHER PUBLICATIONS

Izadi, et al., "C-Slate: A Multi-Touch and Object Recognition System for Remote Collaboration using Horizontal Surfaces", In Proceedings of Second Annual IEEE International Workshop on Horizontal Interactive Human-Computer System, Oct. 10, 2007, pp. 3-10.

"Tangible Atoms", https://web.archive.org/web/20150928195405/https:/vimeo.com/110182860, Retrieved on: Nov. 3, 2016, 2 pages.

"Objectviz", https://web.archive.org/web/20150611034833/http://www.tangibledisplay.com/en/objectviz, Published on: Jun. 11, 2015, 3 pages.

Voelker, et al., "PUCs Demo: Detecting Transparent, Passive Untouched Capacitive Widgets on Unmodified Multi-touch Displays", In Proceedings of ACM Symposium on User Interface Software and Technology, Oct. 8, 2013, 2 pages.

Yu, et al., "TUIC: Enabling Tangible Interaction on Capacitive Multi-touch Display", In Proceedings of SIGCHI conference on Human Factors in Computing Systems, May 7, 2011, 10 pages.

"Tangible Display", http://www.tangibledisplay.com/en/objectviz/, Retrieved on: Nov. 3, 2016, 14 pages.

Humphries, Matthew, "iPad & iPhone tactile object recognition system bodes well for board games", http://www.geek.com/apple/ipad-iphone-tactile-object-recognition-system-bodes-well-for-board-games-1280216/, Published on: Aug. 27, 2010, 5 pages.

"40" SUR40 SMART Signage", http://www.samsung.com/uk/business/business-products/smart-signage/professional-display/LH40SFWTGC/EN, Retrieved on: Nov. 3, 2016, 10 pages.

"Samsung SUR40 with Microsoft PixelSense", https://www.youtube.com/watch?v=kmOku92MIQc, Published on: Jun. 18, 2012, 1 pages.

Scoble, Robert, "Cool use of Microsoft Surface table at Gnomedex", https://www.youtube.com/watch?v=rkSgRGHU9YI, Published on: Aug. 26, 2009, 1 pages.

Berkebile, Bob, "Physical object to mobile touch screen interaction", https://www.youtube.com/watch?v=Mxz3iSLqSLM, Published on: Dec. 23, 2011, 1 pages.

"Tiggly: makers of interactive toys and iPad learning apps", https://www.tiggly.com/, Retrieved on: Nov. 7, 2016, 7 pages.

Schaper, Hauke, "Physical Widgets on Capacitive Touch Displays", In Master's Thesis at the Media Computing Group, RWTH Aachen University, Apr. 2013, 118 pages.

Weiss, et al., "SLAP widgets: bridging the gap between virtual and physical controls on tabletops", In Proceedings of SIGCHI Conference on Human Factors in Computing Systems, Apr. 6, 2009, pp. 481-490.

Chan, et al., "CapStones and ZebraWidgets: sensing stacks of building blocks, dials and sliders on capacitive touch screens", In Proceedings of SIGCHI Conference on Human Factors in Computing Systems, May 5, 2012, pp. 2189-2192.

U.S. Appl. No. 15/418,133, Christian Klein, et al., "Detecting Input Based on a Capacitive Pattern", filed Jan. 27, 2017.

"Non-final Office Action Issued in U.S. Appl. No. 15/418,133", dated Feb. 22, 2018, 10 Pages.

"International Search Report and Written Opinion Issued in PCT Application No. PCT/US2018/016054", dated Apr. 12, 2018, 16 Pages.

"Final Office Action Issued in U.S. Appl. No. 15/418,133", dated Sep. 13, 2018, 13 Pages.

"Non Final Office Action Issued in U.S. Appl. No. 15/418,133", dated Nov. 30, 2018, 15 Pages.

"Final Office Action Issued in U.S. Appl. No. 15/418,133", dated May 28, 2019, 15 Pages.

* cited by examiner

200

300

DETECTING INPUT BASED ON A SENSED CAPACITIVE INPUT PROFILE

BACKGROUND

Computing devices can accept many forms of input from various input devices such as touchscreen displays, keyboards, and mice, among others. In some examples, the computing devices are configured to communicate with input devices. For example, computing devices may store applications or driver files that enable the computing device to communicate with an input device. In some examples, the driver files can indicate to the computing device how to communicate with the input devices.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

An embodiment described herein includes a system for detecting input, wherein the system includes memory and at least one processor that can detect a capacitive input pattern of an object in proximity of the system and compare the capacitive input pattern to a sensed capacitive input profile of a known object, the sensed capacitive input profile comprising information about a plurality of characteristics of the known object. The processor can also determine a confidence that the object in proximity of the system corresponds to the known object based on the capacitive input pattern and at least one of the plurality of characteristics of the known object. Additionally, the processor can assign a functionality associated with the sensed capacitive input profile to the object in proximity of the system if the confidence exceeds a threshold and process input received from the object in proximity of the system according to the functionality.

In another embodiment described herein, a method for detecting input can include detecting a capacitive input pattern of an object in proximity of the system and comparing the capacitive input pattern to a sensed capacitive input profile of a known object, the sensed capacitive input profile comprising information about a plurality of characteristics of the known object. The method can also include determining a confidence that the object in proximity of the system corresponds to the known object based on the capacitive input pattern and at least one of the plurality of characteristics of the known object. Additionally, the method can include assigning a functionality associated with the sensed capacitive input profile to the object in proximity of the system if the confidence exceeds a threshold and processing input received from the object in proximity of the system according to the functionality.

In yet another embodiment described herein, one or more computer-readable storage devices for detecting input can include a plurality of instructions that, based at least on execution by a processor, cause the processor to detect a capacitive input pattern of an object in proximity of the system and compare the capacitive input pattern to a sensed capacitive input profile of a known object, the sensed capacitive input profile comprising information about a plurality of characteristics of the known object. The plurality of instructions can also cause the processor to determine a confidence that the object in proximity of the system corresponds to the known object based on the capacitive input pattern and at least one of the plurality of characteristics of the known object. Additionally, the plurality of instructions can also cause the processor to assign a functionality associated with the sensed capacitive input profile to the object in proximity of the system if the confidence exceeds a threshold and process input received from the object in proximity of the system according to the functionality.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF THE DRAWINGS

The following detailed description may be better understood by referencing the accompanying drawings, which contain specific examples of numerous features of the disclosed subject matter.

DETAILED DESCRIPTION

Figure 1:
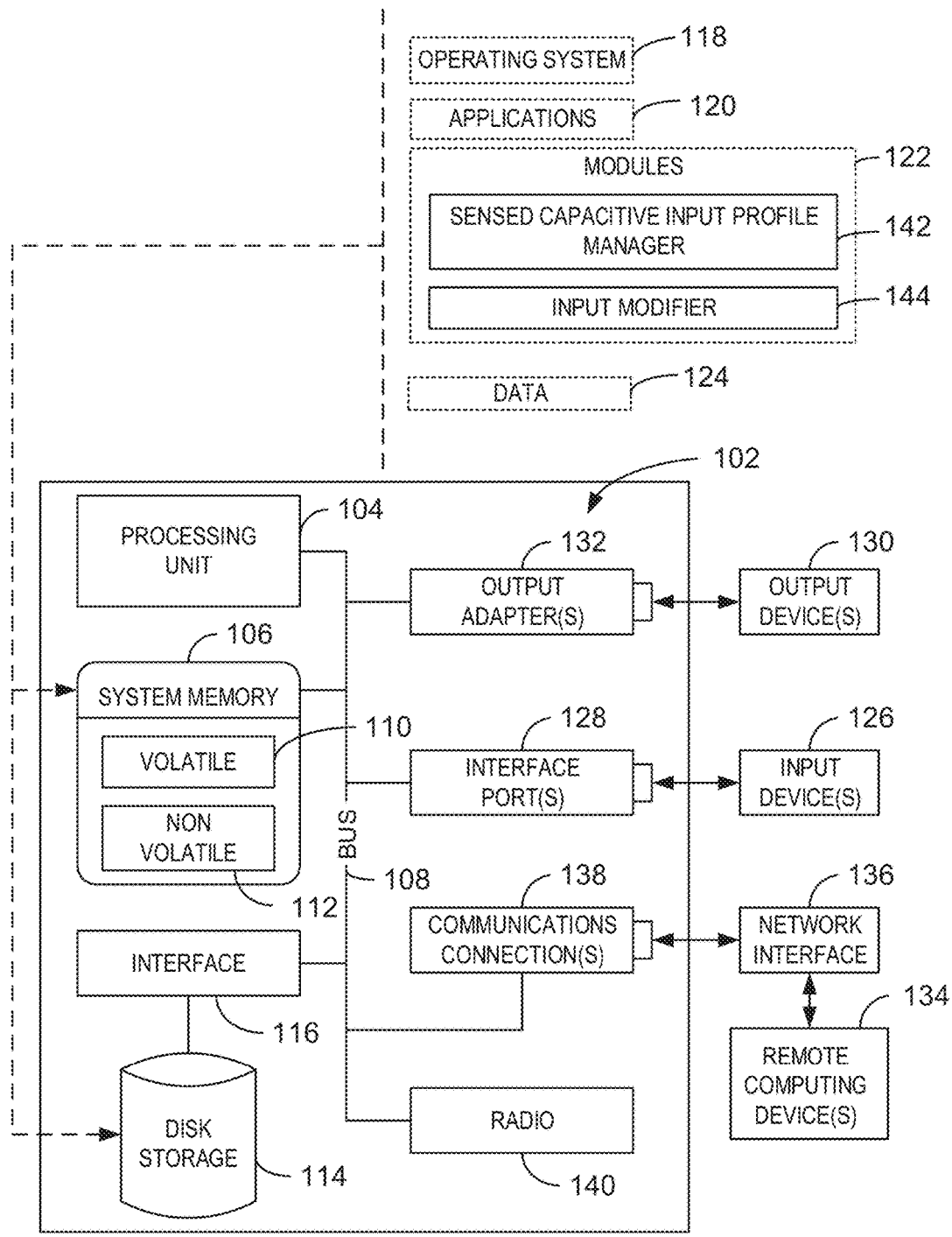
FIG. 1 is a block diagram of an example of a computing system that can detect input based on a sensed capacitive input profile.

Techniques described herein enable a computing device to detect input from an object based on a sensed capacitive input profile. An object, as referred to herein, can include any suitable active or passive device that can provide input to a computing device. An active object can include any object with a power source and may additionally include a separate communication channel. For example, an active object may transmit data through the separate communication channel using any suitable short range wireless protocol, among others. In some embodiments, a passive object may not include a power source and can use conductive material to provide a capacitive signal to a computing device via a capacitive touch screen. A sensed capacitive input profile, as referred to herein, can include any suitable geometric shape corresponding to an object. For example, a sensed capacitive input profile can indicate any suitable shape of an edge, side, top, bottom, or end of an object. The sensed capacitive input profile can enable a computing device to assign a functionality to an object and detect input from the object based on the functionality.

In embodiments described herein, a system can detect a sensed capacitive input profile for an object. For example, a touch screen display can detect the sensed capacitive input profile based on regions of contact between the object and the touch screen display. The system can also determine a plurality of characteristics corresponding to the object based on the sensed capacitive input profile. For example, a system can determine a size, type, and capability of an object based on a pattern of electrically conductive material affixed to the region of the object that contacts a touch screen display. Furthermore, the system can process input from the object based on the plurality of characteristics. For example, a user interface of an application can be modified based on the object to include additional menus, value indicators, and the like.

In some embodiments, techniques described herein can enable objects to transmit data to a computing device without including additional electronic components in the objects. The techniques described herein also enable a computing device to dynamically detect data from an object based on a position or orientation of the object with respect to a computing device. Techniques described herein also enable the use of sensed capacitive input profiles and characteristics, such as patterns of electrically conductive material, to identify object classes, such as dials or buttons, among others, and their input capabilities. In some embodiments, the input capabilities of an object can include the object's ability to change shape, the presence of buttons, the presence of other movable components, such as sliders, and the ability of the object to rotate, among others. Additionally, the techniques described herein enable the use of objects for mechanical input to control a computing system.

Furthermore, the techniques enable combining use of the objects with multi-touch input or active input devices. Additionally, the techniques described herein enable a system to recognize an object's presence, position, orientation, object class, state (e.g. position of a slider), and capabilities (e.g. supported physical interactions) based on the sensed capacitive input profile. In some embodiments, the techniques described herein can also enable a system to detect additional input from active objects that combine recognition of a device location, device class, and orientation, among others, with other interactions communicated over a wired or wireless protocol such as wireless protocols, radio frequency digitizers, and the like. For example, an object may include integrated buttons or touch gesture surface that accept input and transmit the input to a system via any suitable protocol to exchange information over short distances.

As a preliminary matter, some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 1 discussed below, provide details regarding different systems that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, and the like, or any combination of these implementations. As used herein, hardware may include computer systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable device, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like.

FIG. 1 is a block diagram of an example of a computing system that can detect input based on a sensed capacitive input profile. The example system 100 includes a computing device 102. The computing device 102 includes a processing unit 104, a system memory 106, and a system bus 108. In some examples, the computing device 102 can be a gaming console, a personal computer (PC), an accessory console, a gaming controller, among other computing devices. In some examples, the computing device 102 can be a node in a cloud network.

The system bus 108 couples system components including, but not limited to, the system memory 106 to the processing unit 104. The processing unit 104 can be any of various available processors. Dual microprocessors and other multiprocessor architectures also can be employed as the processing unit 104.

The system bus 108 can be any of several types of bus structure, including the memory bus or memory controller, a peripheral bus or external bus, and a local bus using any variety of available bus architectures known to those of ordinary skill in the art. The system memory 106 includes computer-readable storage media that includes volatile memory 110 and nonvolatile memory 112.

The basic input/output system (BIOS), containing the basic routines to transfer information between elements within the computer 102, such as during start-up, is stored in nonvolatile memory 112. By way of illustration, and not limitation, nonvolatile memory 112 can include read-only memory (ROM), programmable ROM (PROM), electrically programmable ROM (EPROM), electrically erasable programmable ROM (EEPROM), or flash memory.

Volatile memory 110 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 102 also includes other computer-readable media, such as removable/non-removable, volatile/nonvolatile computer storage media. FIG. 1 shows, for example a disk storage 114. Disk storage 114 includes, but is not limited to, devices like a magnetic disk drive, floppy disk drive, tape drive, Jaz drive, Zip drive, LS-drive, flash memory card, or memory stick.

In addition, disk storage 114 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 114 to the system bus 108, a removable or non-removable interface is typically used such as interface 116.

It is to be appreciated that FIG. 1 describes software that acts as an intermediary between users and the basic computer resources described in the suitable operating environment 100. Such software includes an operating system 118. Operating system 118, which can be stored on disk storage 114, acts to control and allocate resources of the computer 102.

System applications 120 take advantage of the management of resources by operating system 118 through program modules 122 and program data 124 stored either in system memory 106 or on disk storage 114. It is to be appreciated that the disclosed subject matter can be implemented with various operating systems or combinations of operating systems.

A user enters commands or information into the computer 102 through input devices 126. Input devices 126 include, but are not limited to, a pointing device, such as, a mouse, trackball, stylus, and the like, a keyboard, a microphone, a joystick, a satellite dish, a scanner, a TV tuner card, a digital camera, a digital video camera, a web camera, any suitable dial accessory (physical or virtual), and the like. In some embodiments, the input devices 126 can include active objects or passive objects. As discussed above, an active object can include any object with a power source and may additionally include a separate communication channel. For example, an active object may transmit data through the separate communication channel using any suitable short range wireless protocol, among others. In some embodiments, a passive object may not include a power source and can use conductive material to provide a capacitive signal to a computing device. In some examples, an input device can include Natural User Interface (NUI) devices. NUI refers to any interface technology that enables a user to interact with a device in a "natural" manner, free from artificial constraints imposed by input devices such as mice, keyboards, remote controls, and the like. In some examples, NUI devices include devices relying on speech recognition, touch and stylus recognition, gesture recognition both on screen and adjacent to the screen, air gestures, head and eye tracking, voice and speech, vision, touch, gestures, and machine intelligence. For example, NUI devices can include touch sensitive displays, voice and speech recognition, intention and goal understanding, and motion gesture detection using depth cameras such as stereoscopic camera systems, infrared camera systems, RGB camera systems and combinations of these. NUI devices can also include motion gesture detection using accelerometers or gyroscopes, facial recognition, three-dimensional (3D) displays, head, eye, and gaze tracking, immersive augmented reality and virtual reality systems, all of which provide a more natural interface. NUI devices can also include technologies for sensing brain activity using electric field sensing electrodes. For example, a NUI device may use Electroencephalography (EEG) and related methods to detect electrical activity of the brain. The input devices 126 connect to the processing unit 104 through the system bus 108 via interface ports 128. Interface ports 128 include, for example, a serial port, a parallel port, a game port, and a universal serial bus (USB).

Output devices 130 use some of the same type of ports as input devices 126. Thus, for example, a USB port may be used to provide input to the computer 102 and to output information from computer 102 to an output device 130.

Output adapter 132 is provided to illustrate that there are some output devices 130 like monitors, speakers, and printers, among other output devices 130, which are accessible via adapters. The output adapters 132 include, by way of illustration and not limitation, video and sound cards that provide a means of connection between the output device 130 and the system bus 108. It can be noted that other devices and systems of devices provide both input and output capabilities such as remote computing devices 134.

The computer 102 can be a server hosting various software applications in a networked environment using logical connections to one or more remote computers, such as remote computing devices 134. The remote computing devices 134 may be client systems configured with web browsers, PC applications, mobile phone applications, and the like. The remote computing devices 134 can be a personal computer, a server, a router, a network PC, a workstation, a microprocessor based appliance, a mobile phone, a peer device or other common network node and the like, and typically includes many or all of the elements described relative to the computer 102.

Remote computing devices 134 can be logically connected to the computer 102 through a network interface 136 and then connected via a communication connection 138, which may be wireless. Network interface 136 encompasses wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection 138 refers to the hardware/software employed to connect the network interface 136 to the bus 108. While communication connection 138 is shown for illustrative clarity inside computer 102, it can also be external to the computer 102. The hardware/software for connection to the network interface 136 may include, for exemplary purposes, internal and external technologies such as, mobile phone switches, modems including regular telephone grade modems, cable modems and DSL modems, ISDN adapters, and Ethernet cards.

The computer 102 can further include a radio 140. For example, the radio 140 can be a wireless local area network radio that may operate one or more wireless bands. For example, the radio 140 can operate on the industrial, scientific, and medical (ISM) radio band at 2.4 GHz or 5 GHz. In some examples, the radio 140 can operate on any suitable radio band at any radio frequency.

The computer 102 includes one or more modules 122, such as a sensed capacitive input profile manager 142, and an input modifier 144. In some embodiments, the sensed capacitive input profile manager 142 can detect a capacitive input pattern of an object in proximity of the system and compare the capacitive input pattern to a sensed capacitive input profile of a known object, the sensed capacitive input profile comprising information about a plurality of characteristics of the known object. For example, the sensed capacitive input profile manager 142 can detect a capacitive input pattern, such as a pattern of electrically conductive material attached to an object, which contacts a touch screen display. The sensed capacitive input profile manager 142 can also compare the detected pattern of electrically conductive material to patterns of electrically conductive material corresponding to known objects.

In some embodiments, the sensed capacitive input profile manager 142 can also determine a confidence that the object in proximity of the system corresponds to the known object based on the capacitive input pattern of the known object and at least one of the plurality of characteristics of the known object. For example, the sensed capacitive input profile manager 142 can determine that the observed pattern or characteristic of an object likely corresponds to a known object with a known pattern or characteristic. Additionally, the input modifier 144 can assign a functionality associated with the sensed capacitive input profile to the object in proximity of the system if the confidence exceeds a threshold and process input received from the object in proximity of the system according to the functionality. The sensed capacitive input profile manager 142 and the input modifier 144 are described in greater detail below in relation to FIGS. 2 and 3.

It is to be understood that the block diagram of FIG. 1 is not intended to indicate that the computing system 102 is to include all of the components shown in FIG. 1. Rather, the computing system 102 can include fewer or additional components not illustrated in FIG. 1 (e.g., additional applications, additional modules, additional memory devices, additional network interfaces, etc.). Furthermore, any of the functionalities of the sensed capacitive input profile manager 142, and the input modifier 144 may be partially, or entirely, implemented in hardware and/or in the processor 104. For example, the functionality may be implemented with an application specific integrated circuit, in logic implemented in the processor 104, or in any other device.

Figure 2:
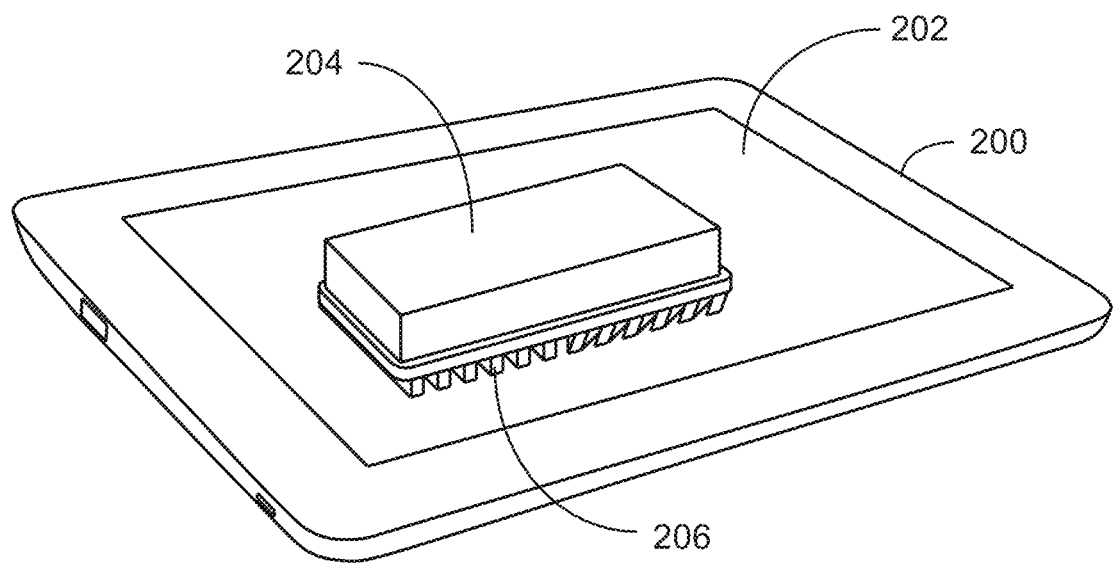
FIG. 2 is a diagram illustrating an example system comprising a computing device and an object.

FIG. 2 is a diagram illustrating a system that includes a touch screen display and an object with a sensed capacitive input profile. The system 200 may include the sensed capacitive input profile manager 142 and an input modifier 144 of computing system 102 of FIG. 1.

In some embodiments, the system 200 can include a touch screen display 202 that can detect any input using capacitive capabilities. In some embodiments, the touch screen display 202 can detect input from a stylus, or an object 204, among others. As discussed above, an object can be an active device or a passive device. In some examples, an active object can include a power source and can transmit data to the system 200 using any suitable wired or wireless protocol. A passive object may not include a power source and can provide input to the system 200 by contacting the touch screen display 202. A passive object can include any suitable rigid object, plastic object, multiple connected objects, objects that are both rigid and malleable, and the like. The object 204 may be any suitable shape and may include various capabilities. The objects are described in greater detail below in relation to FIG. 3.

In some embodiments, the object 204 can include patterns of electrically conductive material 206 attached to a surface of the object 204. In some embodiments, the electrically conductive material 206 is raised above the surface of the object 204. In some examples, the electrically conductive material 206 is placed on an edge of the object 204 to enable detection of an observable characteristic of the object 204. For example, the electrically conductive material 206 can include any number of geometric patterns on each side of the object. The geometric patterns of the electrically conductive material 206 can enable a touch screen display 202 to detect the geometric patterns when a portion of the object 204 is placed in contact with a touch screen display 202.

The electrically conductive material 206, when placed in contact with the touch screen display 202, can provide information to the system 200 such as a functionality associated with the object 204. The functionality can include a class of the object, and the like. For example, the functionality can indicate if an object 204 is a slider object, a dial object, a fixed object, and the like. In some examples, the electrically conductive material 206 can include any suitable number of geometric figures such as circles, squares, or rectangles, parallel or perpendicular lines, and parallel lines at any suitable angle, among others. The geometric patterns of the electrically conductive material 206 can be interconnected, such as with lines, or the geometric patterns may not be interconnected.

In some embodiments, a user interface provided by the touch screen display 202 can be modified based on the object 204. For example, the user interface can provide additional menus corresponding to the object 204, modify existing menus based on the object 204, reconfigure elements displayed in the user interface, and the like. In some examples, the user interface may provide an input scale or values corresponding to an object that belongs to a dial or slider class. The user interface can enable a user to view feedback on the touch screen display 202 as the object is rotated or moved along a sliding path.

It is to be understood that the block diagram of FIG. 2 is not intended to indicate that the system 200 is to include the components shown in FIG. 2. Rather, system 200 can include additional objects and patterns of electronically capacitive material not illustrated in FIG. 2.

Figure 3:
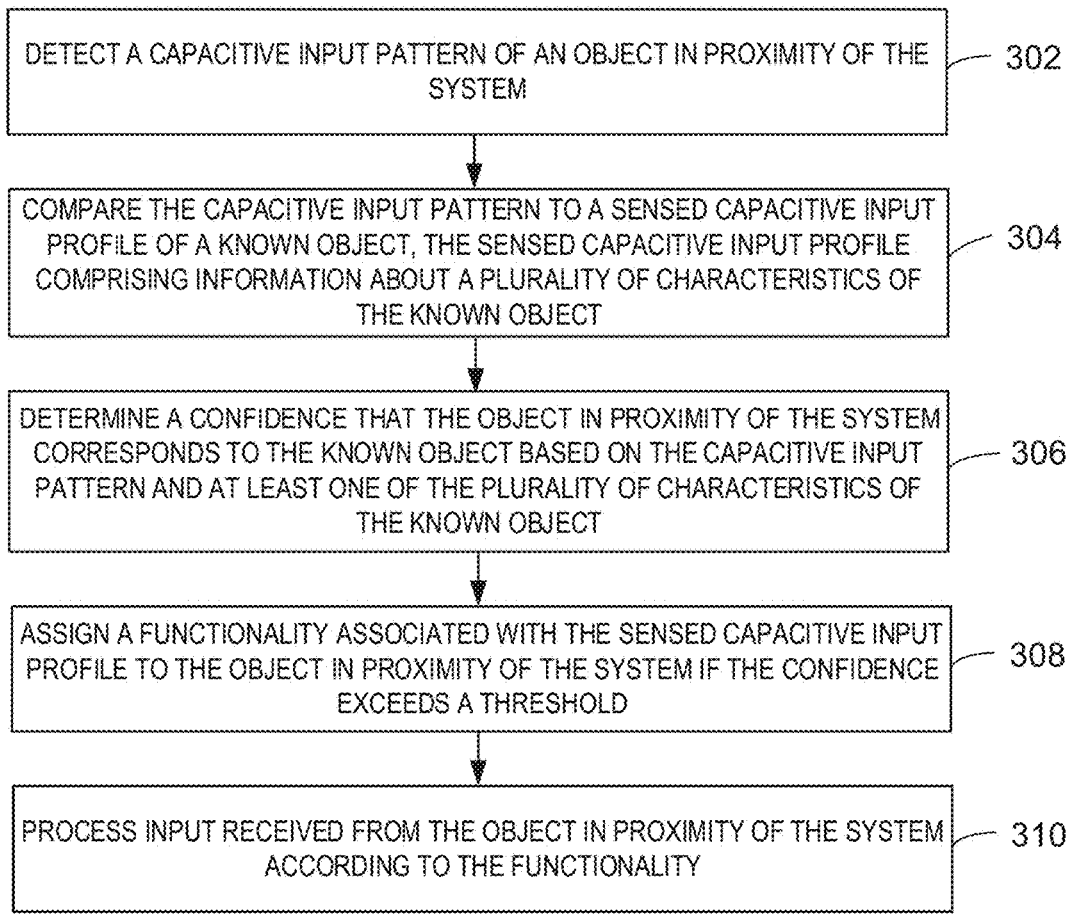
FIG. 3 is a process flow diagram of an example method for detecting input based on a sensed capacitive input profile.

FIG. 3 is a process flow diagram illustrating a method for detecting input from an object based on a sensed capacitive input profile. The method 300 can be implemented with any suitable computing device, such as the computing system 102 of FIG. 1.

At block 302, a sensed capacitive input profile manager 142 can detect a capacitive input pattern of an object in proximity of the system. In some embodiments, the sensed capacitive input profile manager 142 can detect the characteristic using a touch screen device, a camera, sensors, or any suitable combination thereof. For example, the sensed capacitive input profile manager 142 can detect the characteristic of the object based on a region of the object that contacts a touch screen display. In some examples, the region of the object that contacts a touch screen display can include a characteristic such as a pattern of electrically conductive material. For example, the region can include electrically conductive material residing in strips or any suitable geometric pattern along an edge of the object. In some embodiments, the electrically conductive material can be arranged in multiple patterns along each edge of an object. For example, half of a side of an object may include electrically conductive material with a first pattern and the other half of the side of the object may include electrically conductive material with a second pattern. In some embodiments, a side of the object can have any number of different patterns of electrically conductive material and each side of the object can have different patterns. In some embodiments, the sensed capacitive input profile manager 142 can detect an object that can stretch in three dimensions and use the electrically conductive material pattern or digitizer to detect changes in an X or Y dimension.

As discussed above in relation to FIG. 2, the object may include any active device or passive device that can provide input to a system. In some embodiments, an active object can include a touch input surface and transmit data to the system using any suitable wired or wireless protocol. The electrically conductive material pattern may indicate capabilities of an object such as whether an object is passive or active, if the object includes buttons or touch input surfaces, and the like. A passive object can include a dial, a slider, a keypad, a ruler, or a magnifying glass, among others. The passive object may not include additional circuits or a power source. Rather, the passive object can be any suitable material that provides input to a system based on contact with a touch screen display. The passive object can provide the input using any suitable pattern of electrically capacitive material based on contract with a touch screen display.

At block 304, the sensed capacitive input profile manager 142 can compare the capacitive input pattern to a sensed capacitive input profile of a known object, the sensed capacitive input profile comprising information about a plurality of characteristics of the known object. The plurality of characteristics can include profiles of the known object from any suitable angle. For example, the characteristics of the known object can indicate multiple perspectives such as an edge, top, bottom, side, or any other suitable region of the known object and patterns of electrically conductive material for each side of the known object. In some embodiments, the sensed capacitive input profile manager 142 can maintain a database of various characteristics for any number of known objects. Each characteristic can correspond to a different region of the known objects that may contact a touch screen display of a system. In some embodiments, the known characteristics can correspond to geometric shapes and patterns in the electrically conductive material attached to the observed object. For example, any side of an object can include any number of patterns of electrically conductive material as shown below in relation to FIGS. 5 and 6A-6E.

In some embodiments, the sensed capacitive input profile manager 142 can compare a shape size of the region of the observed object that contacted a touch screen display to shape sizes of sides of known objects. The sensed capacitive input profile manager 142 can also, upon detecting a match between the observed object and a known object, compare detected electrically conductive material patterns to determine if the known object matches the observed object. In some examples, the sensed capacitive input profile manager 142 can normalize the detected electrically conductive material patterns to correct differences in size and in rotational angle along a capacitive touch screen surface. In some embodiments, the normalization can include revising one or more dimensions of the detected electrically conductive material pattern to a constant width and offering variations of the width-normalized pattern along different rotational angles. Any variations between the normalized pattern and the known patterns can be compared to determine if the similarity exceeds a predetermined threshold.

At block 306, the sensed capacitive input profile manager 142 can determine a confidence that the object in proximity of the system corresponds to the known object based on the capacitive input pattern and at least one of the plurality of characteristics of the known object. For example, a portion of a side of an object can contact a touch screen display and the pattern of the electrically conductive material on the side of the object can be matched to known characteristics or patterns. In some embodiments, the sensed capacitive input profile manager 142 can determine the confidence based on a portion of the electrically conductive material that is detected. For example, an observer object may contact a touch screen display at an angle such that a portion of the electrically conductive material pattern is detected. The sensed capacitive input profile manager 142 can detect a predetermined threshold indicating a portion of the electrically conductive material pattern that is to be detected in order to provide a match to a known object. For example, the sensed capacitive input profile manager 142 may have a threshold indicating that at least a certain percentage of the observed electrically conductive pattern is to be detected in order to provide a match to a known object. In some embodiments, the confidence may be based in part on a frequency at which the system uses the known object corresponding to the sensed capacitive input profile and the threshold can be modified based on the frequency.

At block 308, an input modifier 144 can assign a functionality associated with the sensed capacitive input profile to the object in proximity of the system if the confidence exceeds a threshold. In some embodiments, each object can have multiple functionalities. In some examples, the functionality can include removing previously entered input, providing input to an application, modifying previously entered input, or any combination thereof. For example, a tip of a stylus shaped device can provide additional input, while the side of the stylus can result in removing previously entered input. The side of the stylus may resemble the edge of an eraser, so the side of the stylus can be assigned the same functionality as an eraser. The functionalities can be based on a position, orientation, type, object class, state, capabilities, and manufacturer of the object, among others. For example, a state of an object may include a position of a slider or a dial. A capability of an object can include a supported physical interaction of the physical device such as whether the physical device can be rotated, stretched, or detect touch input, among others.

In some examples, a type of the object comprises a slider object, a dial object, a mechanical object, a moveable object, an object with interior moving parts, or a fixed object, among others. In some examples, the sensed capacitive input profile manager 142 can detect an object class corresponding to the object based on the pattern or patterns of the electrically conductive material of the object. The object class, as referred to herein, can indicate a set of libraries to be loaded by the sensed capacitive input profile manager 142 to enable a computing device to interact with an object. In some examples, the sensed capacitive input profile manager 142 can detect a capability of the object to change size based on the spatial relations of the electrically conductive material. For example, an object may stretch or shrink or be otherwise manipulated as input is provided to a system.

In some embodiments, the sensed capacitive input profile manager 142 can detect that the object is an active device or a passive device based on the detected patterns of the electrically conductive material and a sensed capacitive input profile of known patterns of electrically conductive material. As discussed above, a passive object may include any material that can provide input to a device without using power or an electronic transmission of data. For example, a passive object can be any suitable material, such as plastic, that can provide input to a system based on changing the contact points between the passive object and a touch screen of a system. In some embodiments, passive objects can emit a signal detected by a touch screen display or sensor via conductivity, or any other suitable technique. An active object can include any object with a power source that can transmit data to a system using a wired or wireless protocol. In some embodiments, the sensed capacitive input profile manager 142 can detect the location of the object from a contact point between the object and a display device, and detect the size of the object and the type of the object based on the observed pattern of the electrically conductive material.

At block 310, the input modifier 144 can process input received from the object in proximity of the system according to the functionality. For example, the input modifier 144 can remove text or any additional input previously detect. The input modifier 144 can also provide new text, drawings, and the like, based on the input received from the object. For example, the input modifier 144 can draw lines based on the input in accordance with the functionality of the object. In some embodiments, the functionality can indicate a width of lines provided by the object, a color of the lines, whether the lines are solid, and the like.

In some embodiments, the input modifier 144 can modify an application, or an operating system to detect input from the object based on the functionality of the object. In some embodiments, the input modifier 144 can modify the application to provide a menu proximate a location of the object.

In some embodiments, the input modifier 144 can modify a user interface based on a location, a size, an orientation, and a type of the object. For example, the input modifier 144 can reconfigure a user interface based on the location, size, and type of an object. In some examples, the input modifier 144 can provide ranges of values in a user interface of an application proximate the object based on the type of the object. For example, the input modifier 144 can modify an application to display measurement values proximate a ruler object or volume values proximate a dial object corresponding to sound controls, among others.

In one embodiment, the process flow diagram of FIG. 3 is intended to indicate that the steps of the method 300 are to be executed in a particular order. Alternatively, in other embodiments, the steps of the method 300 can be executed in any suitable order and any suitable number of the steps of the method 300 can be included. Further, any number of additional steps may be included within the method 300, depending on the specific application. For example, sensed capacitive input profile manager 142 can detect that the plurality of characteristics include at least a location of a plurality of capacitive input points on the object in proximity of the system. In some examples, the location of the capacitive input points corresponds to a portion of a touch screen display that detects a pattern of electrically conductive material attached to an object. In some embodiments, the sensed capacitive input profile is an asymmetrical pattern and the sensed capacitive input profile manager 142 can detect an orientation of the object based on the asymmetrical pattern.

Figure 4:
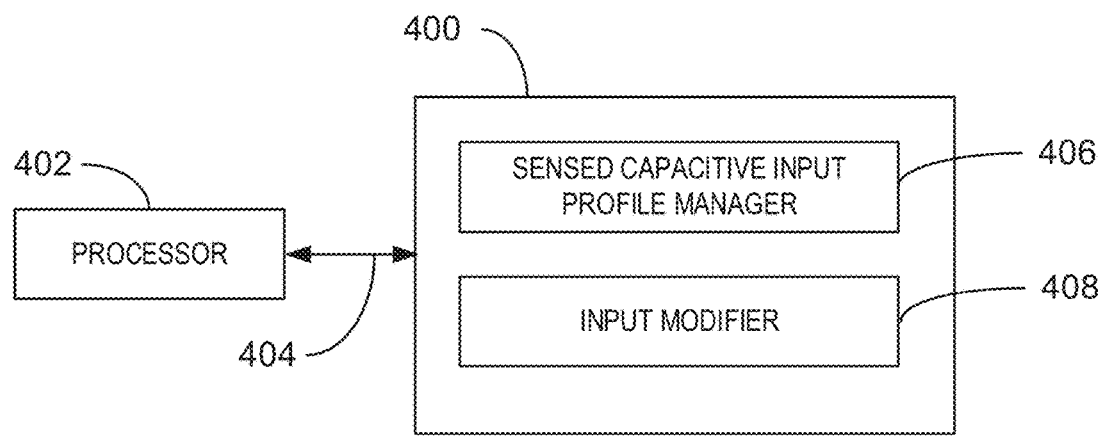
FIG. 4 is a block diagram of an example computer-readable storage media that can detect input based on a sensed capacitive input profile.

FIG. 4 is a block diagram of an example computer-readable storage media that can detect input from an object based on a sensed capacitive input profile. The tangible, computer-readable storage media 400 may be accessed by a processor 402 over a computer bus 404. Furthermore, the tangible, computer-readable storage media 400 may include code to direct the processor 402 to perform the steps of the current method.

The various software components discussed herein may be stored on the tangible, computer-readable storage media 400, as indicated in FIG. 4. For example, the tangible computer-readable storage media 400 can include a sensed capacitive input profile manager 406, and an input modifier 408. In some embodiments, the sensed capacitive input profile manager 406 can detect a capacitive input pattern of an object in proximity of the system and compare the capacitive input pattern to a sensed capacitive input profile of a known object, the sensed capacitive input profile comprising information about a plurality of characteristics of the known object. The sensed capacitive input profile manager 406 can also determine a confidence that the object in proximity of the system corresponds to the known object based on the capacitive input pattern of the known object and at least one of the plurality of characteristics of the known object. In some embodiments, the input modifier 408 can assign a functionality associated with the sensed capacitive input profile to the object in proximity of the system if the confidence exceeds a threshold and process input received from the object in proximity of the system according to the functionality.

It is to be understood that any number of additional software components not shown in FIG. 4 may be included within the tangible, computer-readable storage media 400, depending on the specific application.

Figure 5:
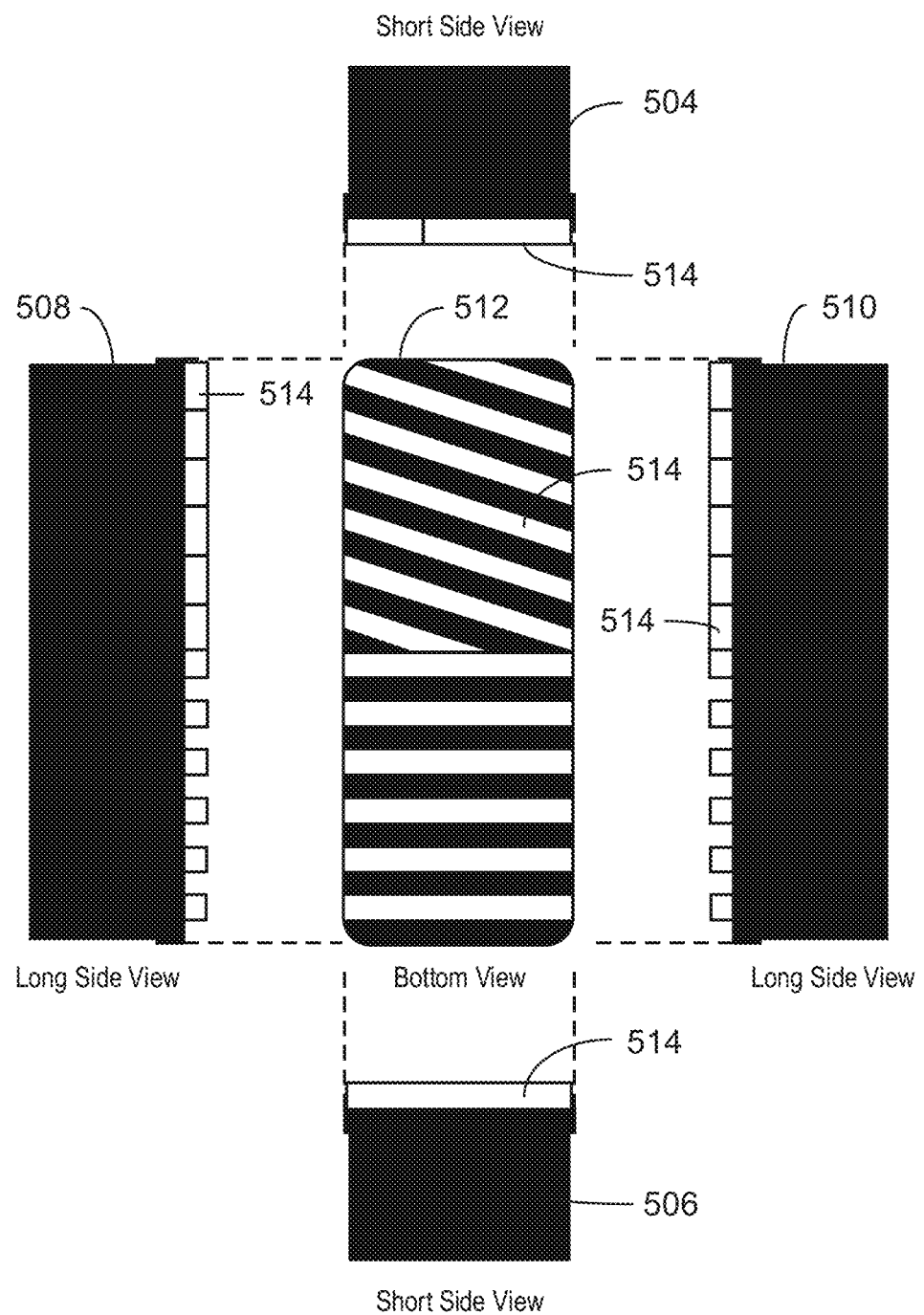
FIG. 5 is a representation of an object with electrically conductive material attached to sides of the object in various patterns.

FIG. 5 is a representation of an object with electrically conductive material attached to sides in various patterns. For example, the object 500 can represent an eraser, a stylus, or any other suitable object with a predetermined functionality. FIG. 5 depicts short side views 504 and 506 of the object 500, long side views 508 and 510 of the object 500, and a bottom view 512 of the object 500.

In some embodiments, the electrically conductive material 514 can be attached to the object 500 in various patterns. For example, half of the bottom 512 of object 500 can include electrically conductive material arranged in perpendicular lines separated by spaces without electrically conductive material. The other half of the bottom 512 of object 500 can include electrically conductive material arranged at an angle to the perpendicular lines. In some examples, portions of the electrically conductive material 514 can be detected with varying pressures, which can be captured as different shades of any suitable color. For example, a gray shading scale can designate a dark gray color as full contact or pressure with a touch screen display while a lighter gray color can indicate a light contact or pressure with the touch screen display.

The long side views 508 and 510 of the object 500 illustrate a side view of the electrically capacitive material 512 attached to a bottom of the object 500. In some embodiments, the long side views 508 and 510 can be detected based on a size of the long side of the object 500 and different spacing between the electrically conductive material 514 indicating different patterns. The short side views 504 and 506 illustrate another side view of the electrically capacitive material 512 attached to the bottom of the object 500. In some embodiments, the short side views 504 and 506 can be detected based on a size of the short side of the object 500 and different spacing between the electrically conductive material 514 indicating different patterns.

It is to be understood that the block diagram of FIG. 5 is not intended to indicate that the object 500 is to only include the patterns of electronically conductive material of FIG. 5. Rather, the object 500 can include any number of additional patterns of electronically conductive material not illustrated in FIG. 5. Furthermore, any of the sides of the object can include any number of patterns of electrically conductive material.

Figures 6A, 6B, 6C:
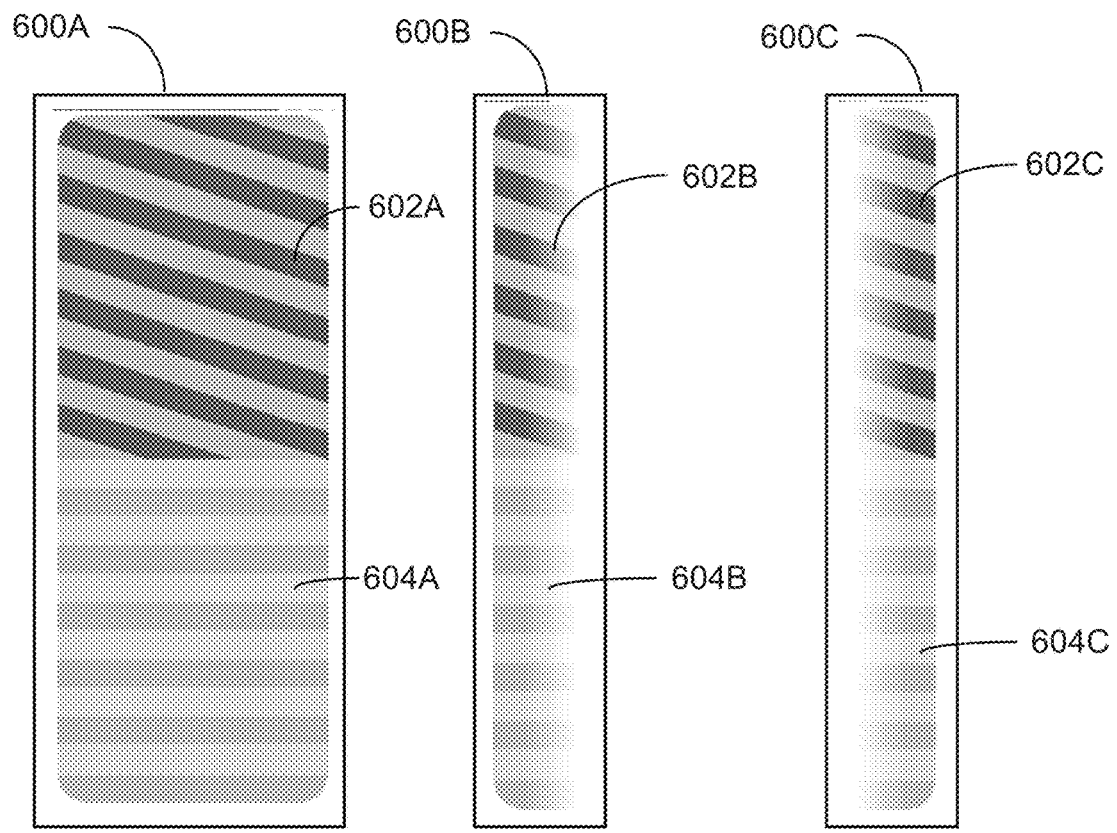
FIGS. 6A-6E depict representations of an object with portions of patterns of electrically conductive material contacting a touch screen display.

FIGS. 6A-6E depict representations of an object with portions of patterns of electrically conductive material contacting a touch screen display. For example, FIG. 6A depicts a bottom of an object 600 with two different electrically conductive material patterns 602A and 604A. In FIG. 6A, the bottom of the object 600 is in full contact with a touch screen display.

FIGS. 6B and 6C depict long side views of an object 600 with two different electrically conductive material patterns 602B and 604B and 602C and 604C. The lighter shades of the electrically conductive material patterns 602B and 604B and 602C and 604C indicate less contact with a touch screen display. For example, the sides of the object 600 may contact a touch screen display at an angle.

Figure 6D:
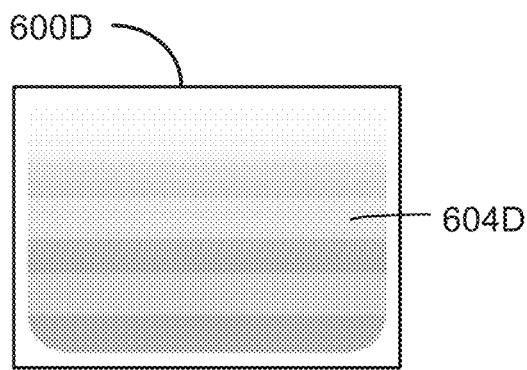
Figure 6E:
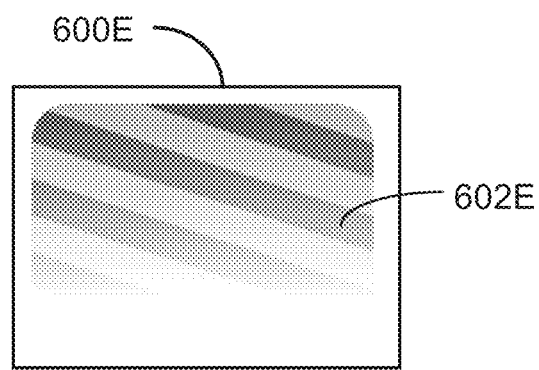

FIGS. 6D and 6E depict a portion of the bottom of the device 600 contacting a touch screen device. For example, FIG. 6D depicts one of two patterns of the electrically conductive material 604D contacting the touch screen display at an angle. FIG. 6E depicts one of two patterns of the electrically conductive material 602E contacting the touch screen display at an angle. In some embodiments, a sensed capacitive input profile manager 142 can assign a lower confidence score to object 600 if a portion of the electrically conductive material pattern is not detected as in FIGS. 6D and 6E.

EXAMPLE 1

In one example, a system for detecting input includes memory and at least one processor configured to detect a capacitive input pattern of an object in proximity of the system and compare the capacitive input pattern to a sensed capacitive input profile of a known object, the sensed capacitive input profile comprising information about a plurality of characteristics of the known object. The at least one processor can also determine a confidence that the object in proximity of the system corresponds to the known object based on the capacitive input pattern and at least one of the plurality of characteristics of the known object. Additionally, the at least one processor can assign a functionality associated with the sensed capacitive input profile to the object in proximity of the system if the confidence exceeds a threshold and process input received from the object in proximity of the system according to the functionality.

Additionally, or alternatively, the plurality of characteristics of the known object can include a physical profile of the object from multiple perspectives. Additionally, or alternatively, the plurality of characteristics can include at least a location of a plurality of capacitive input points on the object in proximity of the system. Additionally, or alternatively, the at least one processor can detect the sensed capacitive input profile via a touch screen display. Additionally, or alternatively, the sensed capacitive input profile can be an asymmetrical pattern and wherein the at least one processor is to detect an orientation of the object based on the asymmetrical pattern. Additionally, or alternatively, the plurality of characteristics can include at least one electrically conductive material pattern. Additionally, or alternatively, a type of the object can include a slider object, a dial object, or a mechanical object with a button. Additionally, or alternatively, the at least one processor can detect an object class corresponding to the object based on the sensed capacitive input profile. Additionally, or alternatively, the object interacts with a touch input surface. Additionally, or alternatively, the at least one processor can detect that the object is an active device or a passive device based on the sensed capacitive input profile. Additionally, or alternatively, the functionality can include removing previously entered input, providing the input to an application, modifying previously entered input, or any combination thereof.

EXAMPLE 2

In another embodiment described herein, a method for detecting input can include detecting a capacitive input pattern of an object in proximity of the system and comparing the capacitive input pattern to a sensed capacitive input profile of a known object, the sensed capacitive input profile comprising information about a plurality of characteristics of the known object. The method can also include determining a confidence that the object in proximity of the system corresponds to the known object based on the capacitive input pattern and at least one of the plurality of characteristics of the known object. Furthermore, the method can include assigning a functionality associated with the sensed capacitive input profile to the object in proximity of the system if the confidence exceeds a threshold and processing input received from the object in proximity of the system according to the functionality.

Additionally, or alternatively, the plurality of characteristics of the known object can include a physical profile of the object from multiple perspectives. Additionally, or alternatively, the plurality of characteristics can include at least a location of a plurality of capacitive input points on the object in proximity of the system. Additionally, or alternatively, the method can include detecting the sensed capacitive input profile via a touch screen display. Additionally, or alternatively, the sensed capacitive input profile can be an asymmetrical pattern and wherein the method is to detect an orientation of the object based on the asymmetrical pattern. Additionally, or alternatively, the plurality of characteristics can include at least one electrically conductive material pattern. Additionally, or alternatively, a type of the object can include a slider object, a dial object, or a mechanical object with a button. Additionally, or alternatively, the method can include detecting an object class corresponding to the object based on the sensed capacitive input profile. Additionally, or alternatively, the object interacts with a touch input surface. Additionally, or alternatively, the method can include detecting that the object is an active device or a passive device based on the sensed capacitive input profile. Additionally, or alternatively, the functionality can include removing previously entered input, providing the input to an application, modifying previously entered input, or any combination thereof.

EXAMPLE 3

In yet another embodiment described herein, one or more computer-readable storage devices for detecting input can include a plurality of instructions that, based at least on execution by a processor, cause the processor to detect a capacitive input pattern of an object in proximity of the system and compare the capacitive input pattern to a sensed capacitive input profile of a known object, the sensed capacitive input profile comprising information about a plurality of characteristics of the known object. The plurality of instructions can also cause the processor to determine a confidence that the object in proximity of the system corresponds to the known object based on the capacitive input pattern and at least one of the plurality of characteristics of the known object and assign a functionality associated with the sensed capacitive input profile to the object in proximity of the system if the confidence exceeds a threshold. Furthermore, the plurality of instructions can cause the processor to process input received from the object in proximity of the system according to the functionality.

Additionally, or alternatively, the plurality of characteristics of the known object can include a physical profile of the object from multiple perspectives. Additionally, or alternatively, the plurality of characteristics can include at least a location of a plurality of capacitive input points on the object in proximity of the system. Additionally, or alternatively, the plurality of instructions can cause the processor to detect the sensed capacitive input profile via a touch screen display. Additionally, or alternatively, the sensed capacitive input profile can be an asymmetrical pattern and wherein the at least one processor is to detect an orientation of the object based on the asymmetrical pattern. Additionally, or alternatively, the plurality of characteristics can include at least one electrically conductive material pattern. Additionally, or alternatively, a type of the object can include a slider object, a dial object, or a mechanical object with a button. Additionally, or alternatively, the plurality of instructions can cause the processor to detect an object class corresponding to the object based on the sensed capacitive input profile. Additionally, or alternatively, the object interacts with a touch input surface. Additionally, or alternatively, the plurality of instructions can cause the processor to detect that the object is an active device or a passive device based on the sensed capacitive input profile. Additionally, or alternatively, the functionality can include removing previously entered input, providing the input to an application, modifying previously entered input, or any combination thereof.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system for detecting input, the system comprising:
memory; and
at least one processor to:
 detect a capacitive input pattern of an object in proximity of the system, the object comprising the capacitive input pattern comprising a geometric pattern of electrically conductive material residing along an edge of the object;

compare the capacitive input pattern to a sensed capacitive input profile of a known object, the sensed capacitive input profile comprising information about a plurality of characteristics of the known object;

determine a confidence that the object in proximity of the system corresponds to the known object based on the capacitive input pattern and at least one of the plurality of characteristics of the known object;

assign a functionality associated with the sensed capacitive input profile to the object in proximity of the system if the confidence exceeds a threshold, the confidence based on a frequency of detecting the capacitive input pattern and a percentage of the electrically conductive material detected; and process input received from the object in proximity of the system according to the functionality.

2. The system recited in claim 1, wherein the plurality of characteristics of the known object comprises a physical profile of the object from multiple perspectives.

3. The system recited in claim 1, wherein the plurality of characteristics comprises at least a location of a plurality of capacitive input points on the object in proximity of the system.

4. The system of claim 1, wherein the at least one processor is to detect the sensed capacitive input profile via a touch screen display.

5. The system of claim 1, wherein the sensed capacitive input profile is an asymmetrical pattern and wherein the at least one processor is to detect an orientation of the object based on the asymmetrical pattern.

6. The system of claim 1, wherein a type of the object comprises a slider object, a dial object, or a mechanical object with a button.

7. The system of claim 1, wherein the at least one processor is to detect an object class corresponding to the object based on the sensed capacitive input profile.

8. The system of claim 1, wherein the object interacts with a touch input surface.

9. The system of claim 1, wherein the at least one processor is to detect that the object is an active device or a passive device based on the sensed capacitive input profile.

10. The system of claim 1, wherein the functionality comprises removing previously entered input, providing the input to an application, modifying previously entered input, or any combination thereof.

11. The system of claim 1, wherein the at least one processor is to capture varying pressures applied by the electrically conductive material as different shades of a color.

12. A method for detecting input, comprising:

detecting a capacitive input pattern of an object in proximity of a system, the object comprising the capacitive input pattern comprising a geometric pattern of electrically conductive material residing along an edge of the object;

comparing the capacitive input pattern to a sensed capacitive input profile of a known object, the sensed capacitive input profile comprising information about a plurality of characteristics of the known object;

determining a confidence that the object in proximity of the system corresponds to the known object based on the capacitive input pattern and at least one of the plurality of characteristics of the known object;

assigning a functionality associated with the sensed capacitive input profile to the object in proximity of the system if the confidence exceeds a threshold, the confidence based on a frequency of detecting the capacitive input pattern and a percentage of the electrically conductive material detected; and processing input received from the object in proximity of the system according to the functionality.

13. The method of claim 12, comprising detecting the sensed capacitive input profile via a touch screen display.

14. The method of claim 12, comprising detecting an orientation of the object based on an asymmetrical pattern.

15. The method of claim 12, wherein a type of the object comprises a slider object, a dial object, or a mechanical object with a button.

16. The method of claim 12, comprising detecting an object class corresponding to the object based on the sensed capacitive input profile.

17. The method of claim 12, wherein the functionality comprises removing previously entered input, providing the input to an application, modifying previously entered input, or any combination thereof.

18. One or more computer-readable storage devices for detecting input comprising a plurality of instructions that, based at least on execution by a processor, cause the processor to:

detect a capacitive input pattern of an object in proximity of a system, the object comprising the capacitive input pattern comprising a geometric pattern of electrically conductive material residing along an edge of the object;

compare the capacitive input pattern to a sensed capacitive input profile of a known object, the sensed capacitive input profile comprising information about a plurality of characteristics of the known object;

determine a confidence that the object in proximity of the system corresponds to the known object based on the capacitive input pattern and at least one of the plurality of characteristics of the known object;

assign a functionality associated with the sensed capacitive input profile to the object in proximity of the system if the confidence exceeds a threshold, the confidence based on a frequency of detecting the capacitive input pattern and a percentage of the electrically conductive material detected; and process input received from the object in proximity of the system according to the functionality.

19. The one or more computer-readable storage devices of claim 18, wherein a type of the object comprises a slider object, a dial object, or a mechanical object with a button.

20. The one or more computer-readable storage devices of claim 18, wherein the plurality of instructions cause the processor to detect an object class corresponding to the object based on the sensed capacitive input profile.

* * * * *